United States Patent
Batchelor et al.

(10) Patent No.: US 6,729,132 B2
(45) Date of Patent: May 4, 2004

(54) REMOTELY AND DIRECTLY PEDAL OPERATED HYDRAULIC COMPACT BOOSTER FOR BI-DIRECTIONAL BRAKING

(75) Inventors: Mark Batchelor, Newport (GB); Michael Williamson, Newport (GB)

(73) Assignee: Meritor Heavy Vehicle Braking Systems (UK) Ltd (GB)

( * ) Notice: Subject to any disclaimer, the term of this patent is extended or adjusted under 35 U.S.C. 154(b) by 6 days.

(21) Appl. No.: 10/199,378

(22) Filed: Jul. 19, 2002

(65) Prior Publication Data

US 2004/0011034 A1 Jan. 22, 2004

(51) Int. Cl.⁷ .............................................. B60T 13/00
(52) U.S. Cl. ........................ 60/547.1; 60/549; 60/567; 60/548; 60/581
(58) Field of Search ................................ 60/547.1, 549, 60/555, 567, 581, 548, 584, 585

(56) References Cited

U.S. PATENT DOCUMENTS

| | | | | |
|---|---|---|---|---|
| 3,313,110 A | * | 4/1967 | Von Rohr | 60/567 |
| 3,416,316 A | * | 12/1968 | Lewis | 60/581 |
| 3,436,917 A | * | 4/1969 | Branson | 60/567 |
| 3,568,441 A | * | 3/1971 | Walker | 60/581 |
| 3,640,067 A | * | 2/1972 | Ingram | 60/567 |
| 4,134,266 A | * | 1/1979 | Sertori | 60/567 |
| 4,178,757 A | * | 12/1979 | Ketterling et al. | 60/581 |
| 4,468,927 A | * | 9/1984 | Farr | 60/547.1 |
| 4,846,314 A | | 7/1989 | Nishikawa | |
| 6,478,385 B1 | * | 11/2002 | Nishii et al. | 60/547.1 |

FOREIGN PATENT DOCUMENTS

| | | |
|---|---|---|
| EP | 0314638 | 5/1989 |
| EP | 0669239 B1 | 12/1999 |
| FR | 2824299 | 11/2002 |
| GB | 2098687 | 11/1982 |

OTHER PUBLICATIONS

European Search Report dated Oct. 8, 2003.

* cited by examiner

Primary Examiner—Thomas E. Lazo
(74) Attorney, Agent, or Firm—Carlson, Gaskey & Olds

(57) ABSTRACT

A bi-directional braking assembly for a vehicle includes a hydraulic booster assembly for applying proportional fluid pressure to a brake assembly and is actuated by a forward pedal. A master cylinder actuated by a rear pedal communicates fluid to the hydraulic booster assembly through a hydraulic booster valve. The hydraulic booster valve includes a piston movable to regulate hydraulic pressure in response to actuation of first and second plungers. The second plunger is movable along an axis separate from the first plunger in response to actuation of a master cylinder by a rear pedal. The master cylinder provides pressure to the booster valve assembly that acts on an area between the first and second plunger assemblies to move the second plunger away from the first plunger to actuate and move the booster piston within the valve.

22 Claims, 4 Drawing Sheets

REMOTELY AND DIRECTLY PEDAL OPERATED HYDRAULIC COMPACT BOOSTER FOR BI-DIRECTIONAL BRAKING

BACKGROUND OF THE INVENTION

The invention relates generally to a booster valve assembly for a bi-directional braking system, and specifically to a booster valve assembly where both forward and rearward braking are facilitated by a single booster used for both directions of travel.

Typically, agricultural vehicles require two braking circuits along with master cylinders that work independently of each other. The independent operation of each brake circuit allows for brake steering of the vehicle. Each circuit includes a separate brake pedal corresponding to a left circuit and a right circuit of the motor vehicle. The brake steering allows for tight turning circles of the agricultural vehicle. In such braking systems, the pressure is balanced by a compensating valve that joins two master cylinders along with the corresponding pressure chambers. The coupling of the two master cylinders allows for braking of both circuits.

Many agricultural vehicles are designed for bi-directional operation meaning that an operator of the vehicle can sit either facing forward or facing rearward while operating the vehicle. In such vehicles, separate forward and rear brake pedals are provided for forward and rearward braking. The master cylinder for rearward braking need to engage the same braking circuit as the forward direction brake pedals. Typically, this requires a braking comprising complicated hydraulic circuits and combinations of valves. As appreciated, the use of valving and other complicated fluid pressure routing increases costs along with the complexity of the machine.

Accordingly, it is desirable to design a hydraulic brake booster valve capable of directly operating the vehicle brakes both directly and remotely.

SUMMARY OF THE INVENTION

An embodiment of this invention is a hydraulic booster valve including a plunger split into two parts to allow both direct and remote operation.

An embodiment of this invention includes a housing defining an internal bore. A booster piston disposed within the internal bore moves between open and closed positions to regulate fluid pressure between an inlet and outlet. The booster piston is actuated by a plunger disposed within a plunger bore within the booster piston. Movement of the booster piston within the internal bore covers and uncovers an inlet port. The inlet port receives pressure from the pressure inlet and directs that pressure against the booster piston to bias the booster piston for the actuation of the brake assembly.

The booster piston is actuated for movement along and within the internal bore by movement of the plunger assembly. The plunger assembly includes a first and second plunger that is movable within the internal plunger bore. The first plunger is attached to a push rod actuated by a forward brake pedal. The second plunger is movable relative to the first plunger and includes an internal passageway aligning with an inlet port defined by the booster piston. A second inlet port communicating with a master cylinder actuated by a rear brake pedal provides fluid pressure to an annular passage defined in the second plunger. The annular passageway provides fluid communication between the second inlet port and an area disposed between the first and second plunger.

Actuation of the booster piston by a forward brake pedal is accomplished by pushing the push rod which in turn moves the first plunger against the second plunger towards alignment of the internal passageway defined by the second plunger with an inlet port. As the inlet port aligns with the internal passageways of the second plunger fluid pressure is allowed to communicate with a plunger bore within the booster piston to force the booster piston to allow pressure to flow from the inlet.

When an operator is actuating brake pedals from the rearward position, the first plunger remains at its initial location within the plunger bore. Fluid pressure allowed into the second inlet and through the annular passageway between the area between the first and second plunger forces the second plunger towards alignment with the inlet port. The first plunger is forced in an opposite direction and held from exiting the plunger bore by a clip. The clip prevents movement of the first plunger beyond a rest position.

The valve includes a direct twin compact booster with a plunger split into two parts. The first plunger sticks directly to the forward pedals by the push rod. The first plunger is retained by a clip within the plunger bore. The second plunger is connected hydraulically to the rearward pedals. Both the first and second plungers slide within the plunger bore. The hydraulic fluid used to operate the second plunger is sealed by various seals disposed on the second plunger. Because both plungers are disposed within the plunger bore and include a uniform diameter along its length, both plungers operate the booster with the same booster ratio. In other words, the forward and rearward brakes will operate the brakes such that the common proportions of pedal movement will result in the same proportion of braking force.

Accordingly, a single hydraulic booster valve and master cylinder are actuatable by both forward and rear pedals simplifying operation and construction of the braking system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
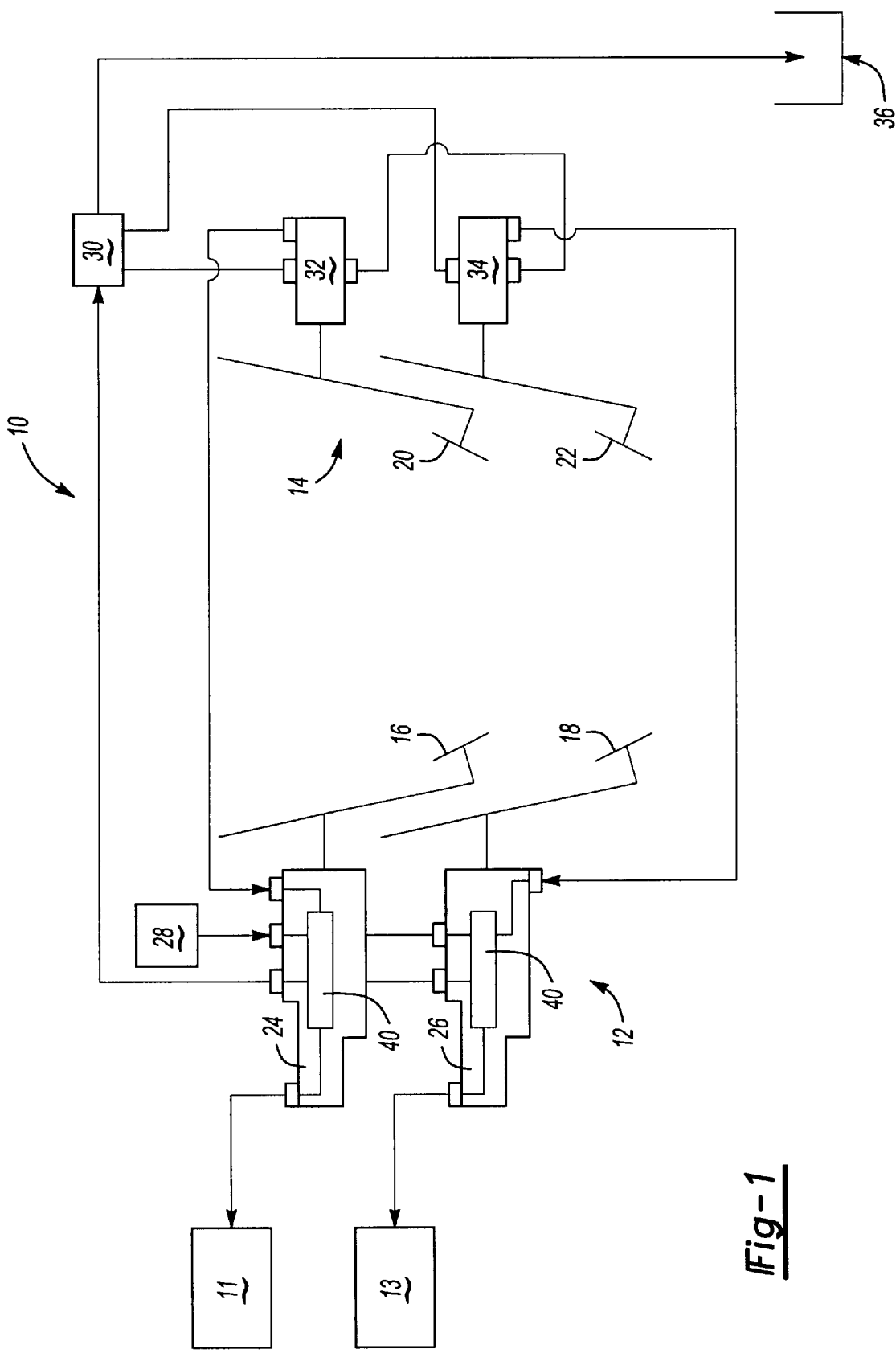
FIG. 1 is a schematic illustration of a hydraulic circuit with a bi-directional pedal arrangement.

Referring to FIG. 1, wherein like numerals indicate like or corresponding parts throughout the several views, the invention is a hydraulic booster valve for a bi-directional braking system. FIG. 1 illustrates a hydraulic circuit 10 for a bi-directional braking system. The hydraulic circuit 10 includes front 12 and rear 14 brake positions. The front brake positions include left and right brake pedals 16, 18. Each of the brake pedals 16, 18 directly operate first and second hydraulic booster assemblies 24, 26. Each of the booster assemblies 24, 26 actuates an individual braking system shown schematically at 11, 13. A pressure source 28 provides pressure to each of the booster assemblies 24, 26 to increase braking pressure provided upon brake actuation. The booster assemblies 24, 26 are actuated independent of each other by the pedals 16, 18. Independent actuation of each of the braking systems 11, 13 allows brake steering of a vehicle.

The rear braking position 14 actuate includes left and right brake pedals 20, 22. Each of the brake pedals 20, 22 operates one master cylinder 32, 34. Each of master cylinder 32,34 is in hydraulic communication with a corresponding booster assembly 24, 26. Actuation of the rear pedals 20, 22 will remotely actuate one of the booster assemblies 24, 26 that corresponds with that particular brake pedal. A common reservoir 30 provides a supply of hydraulic fluid for the master cylinders and thereby the booster assemblies 24, 26.

The hydraulic circuit illustrated at 10 in FIG. 1 uses front and rear brake pedals with a single booster assembly corresponding to a left and right side of a vehicle. Direct as well as remote operation of the booster assemblies 24, 26 is provided for by a hydraulic booster valve 40 disposed in each of the booster assemblies 24, 26.

Figure 2:
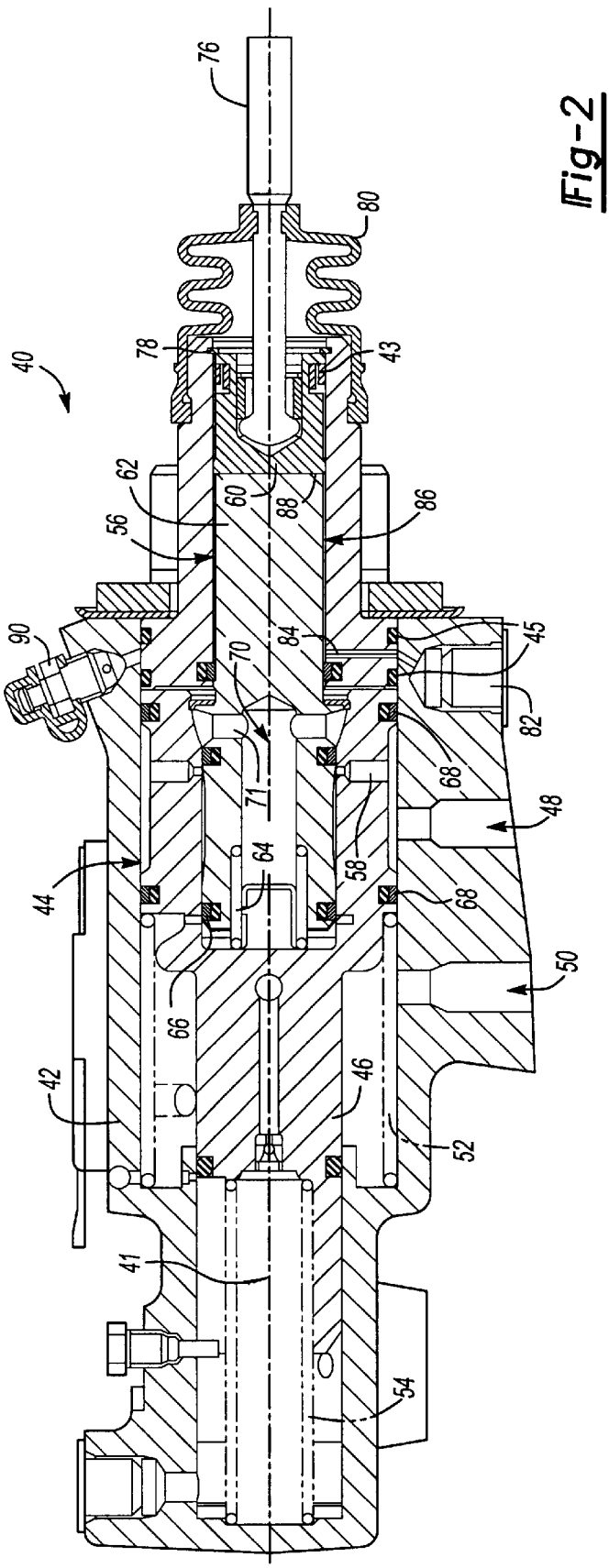
FIG. 2 is a cross-sectional view of the hydraulic booster valve of this invention in a closed position.

Referring to FIG. 2, the booster valve 40 includes a body 40 defining an internal chamber 44. Within the internal chamber 44 is a booster piston 46. The booster piston moves along an axis 41 between a open and closed positions. Movement of the booster piston 46 within the booster cavity 44 regulates the flow of pressurized fluid between inlet 48 and outlet 50. The quotient of the areas across piston bore 44 and plunger bore 56 determine the boost ratio. The product of the input force to pushrod 76 and the boost ratio determine and output force from piston 46, whereby said output force generates a boosted pressure in the master cylinder connected to the braking systems 11, 13. Movement of the booster piston 46 proportionally regulates flow of pressurized fluid to boost hydraulic pressure to the braking systems 11, 13.

The second housing 43 includes a plunger bore 56. The plunger bore 56 houses a first and second plunger 60, 62. The first and second plunger 60, 62 are movable relative to each other along axis 41. The first plunger 60 is attached to a push rod 76. The push rod 76 is directly actuated by one of the forward pedals 16, 18 shown in FIG. 1. A c-clip 78 disposed within the secondary housing 43 prevents the first plunger 60 from moving out of the secondary housing 43. The c-clips 78 contain first plunger 60 within second housing 43. The second housing 43 is disposed within the body booster cavity 44 and extends from the booster cavity 44. The secondary housing 43 includes seals 45 that prevent leakage of the hydraulic fluid from the booster cavity 44. The booster piston includes seals 68 that seal hydraulic fluids within a confined area.

The booster piston 46 is biased toward a closed position and toward the secondary housing 43 by biasing members 54 and 52. A biasing member 64 is disposed within the annular area between the piston 46 and second housing 43 to bias the first and second plunger 60, 62 towards the closed position. In the closed position, hydraulic fluid provided at the inlet 48 is blocked from proceeding through booster inlet 58 into the plunger bore 56. In this position, booster pressure is not provided to the braking systems 11 and 13.

Actuation of one of a forward brake pedal moves the push rod 76 against the first and second plungers 60, 62, causing movement along the axis 41 toward the open position. The second plunger 62 includes internal passage 70 and cross slots 71. As the plunger 76 moves the first and second plungers 60, 62 toward the open position, the cross slots 71 become aligned with the booster inlet 58. Once the booster inlet 58 is aligned with the cross slots 71, hydraulic pressure is allowed between piston 46 and second housing 43. The hydraulic pressure introduced into the bore 44 between piston 46 and second housing 43 moves the booster piston 46 toward an open position where hydraulic pressure is provided to one of the corresponding braking systems 11 and 13.

The secondary body 43 includes a passage 84 communicating with an annular passage 86 which in turn communicates with an area 88 disposed between the first and second plunger 60, 62. Inlet 82 introduces fluid pressure and flow from the master cylinders 32, 34 of the rear portion of the hydraulic system. Actuations of the rear pedals 14 allows hydraulic fluid to flow into the secondary inlet 82 through passage 84, into passage 86, to the area 88. Pressure in area 88 forces the separation of the second plunger 62 away from the first plunger 60. The first plunger 60 is forced against the clip 78 and is stopped and held in position. The second plunger 62 is not constrained as the first plunger 60 and therefore moves away from the first plunger 60 toward an open position.

Because both plungers are located within a common plunger bore 56, but diameter 62 is less than diameter 60 so to allow transference of fluid from inlet 82 to annulus 88 actuation of only the second plunger 62 results in a common boost ratio to that experienced with both plungers 60 and 62 moved by the push rod 76 since the diameter of plunger 62 determines the boost ratio.

Figure 3:
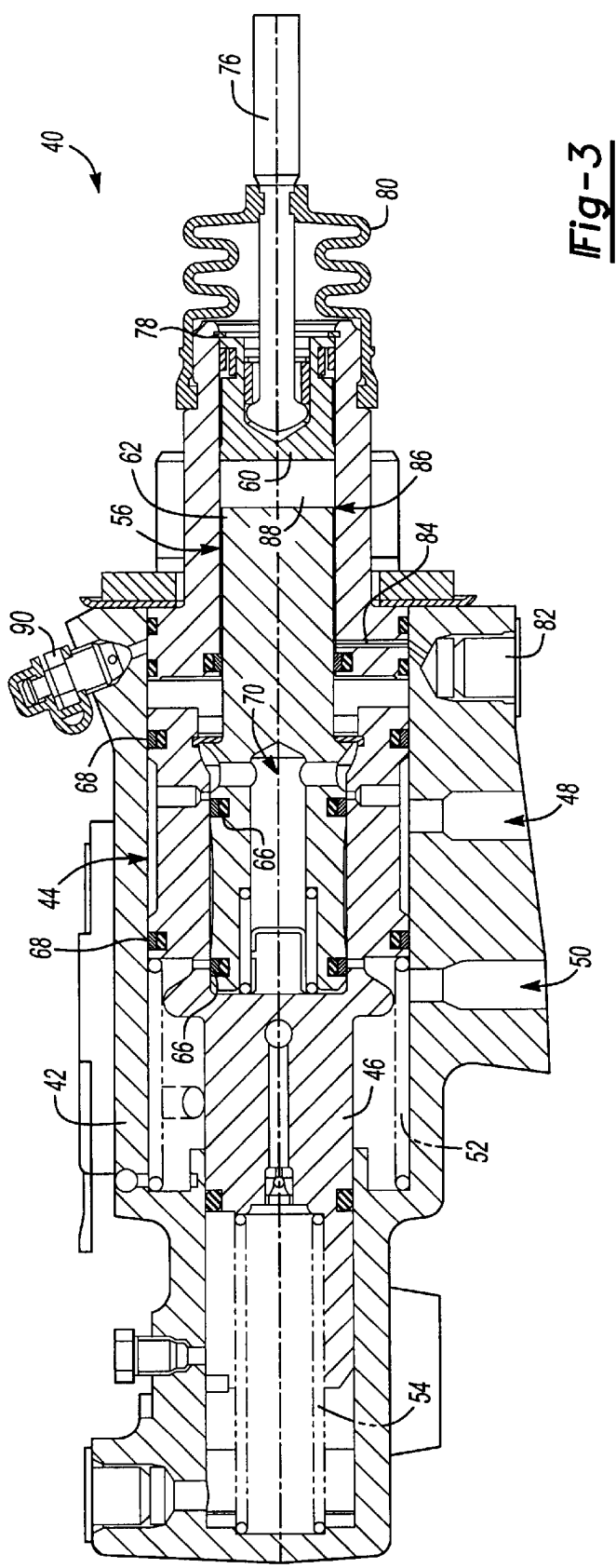
FIG. 3 is a cross-sectional view of the hydraulic booster valve of this invention in an open position.

Referring to FIG. 3, the valve 40 is shown in a substantially open position where the second plunger 62 has moved away from the first plunger 60. This condition occurs upon actuation of one of the rear pedals 20, 22. Actuation of one of the rear pedals 20, 22 will release hydraulic fluid from one of the master cylinders 32, 34 to communicate through the secondary inlet 82 with through passage 84, annular passage 86 to the area 88. The pressure encountered in area 88 forces the second plunger 62 away from the first plunger 60. The c-clip 78 maintains the position of the first plunger 60 such that the second plunger 62 moves away from the first plunger 60. Movement of the second plunger 62 aligns the cross slots 70 of the second plunger 62 with the inlet 58 of the booster valve.

The booster inlet 58 introduces hydraulic fluid into the annulus 44 between piston 46 and second housing 43 to move the booster piston 46 toward an open or boost position providing brake boosting pressure to the brake systems 11, 13. It should be understood that it is within the contemplation of this invention that any booster piston configuration as is known to a worker skilled in the art is within the scope of this invention. Further, the specific configuration of providing an increased or boost pressure to the brake systems 11 and 13 is shown by way of an example only. Other configurations of openings cooperating with each other to provide a boost pressure to the brake systems are within the contemplation of this invention.

The valve 40 also includes a bleed valve 90. The bleed valve 90 is used to bleed air from annuli 56 and 88, hole 84 and master cylinders 20 and 22 and connecting pipe work between said cylinders. As appreciated, a worker skilled in the art would understand that the specific configuration of the bleed valve 90 may be of any type known to a worker skilled in the art. A push rod 76 includes a dust boot 80 protecting and preventing contamination from entering the valve 40.

Figure 4:
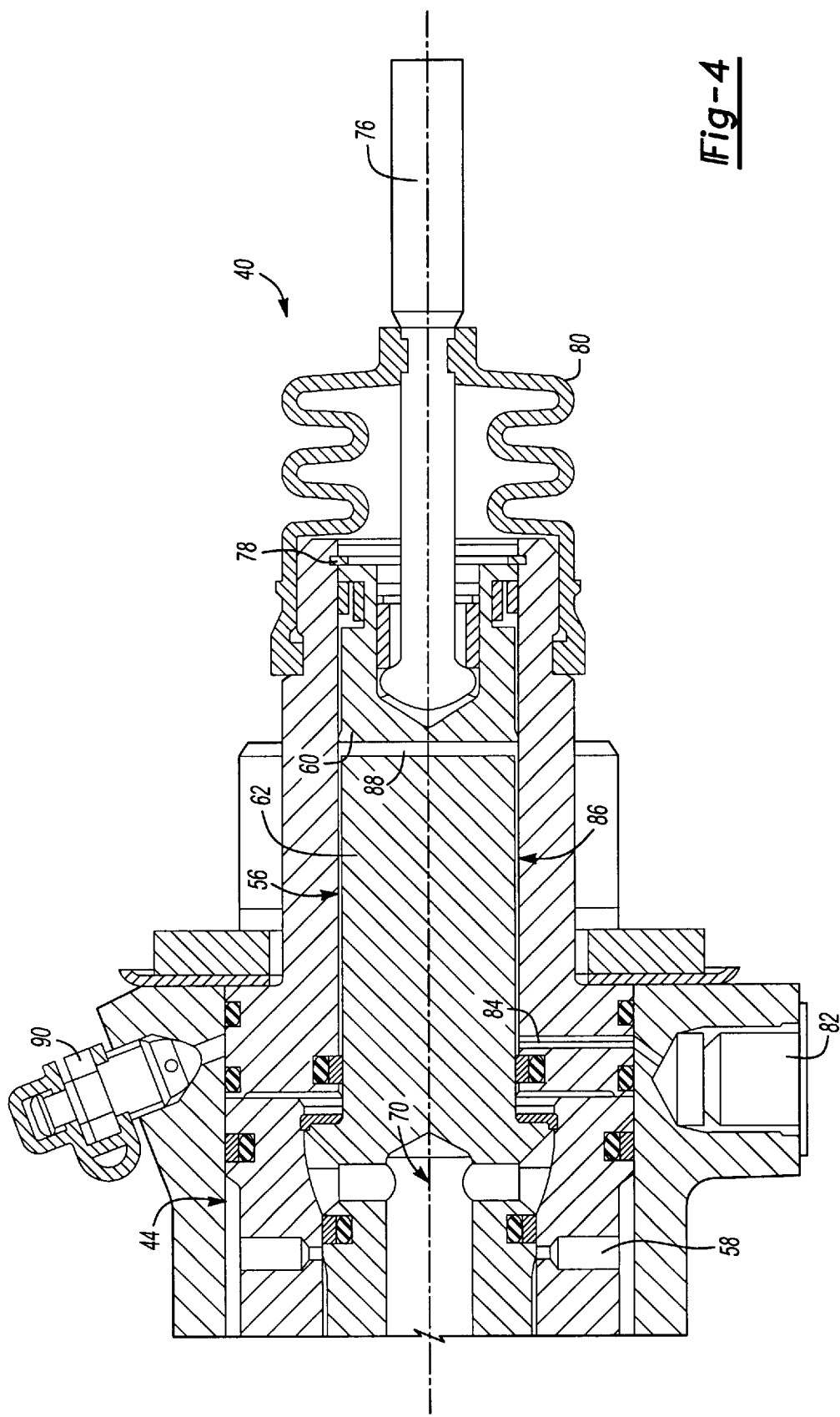
FIG. 4 is an enlarged cross-sectional view of the first and second plunger disposed within the hydraulic booster valve.

Referring to FIG. 4, the secondary inlet 82, passage 84, annular passage 86 and area 88 are shown. The pressure and hydraulic fluid flow entering the secondary inlet 82 in response to actuation of one of the secondary pedals 20, 22 will force the second plunger 62 away from the first plunger 60. The first plunger 60 is forced in an opposite direction than the second plunger 62. Clip 78 prevents and constrains movement of the first plunger 60. The second plunger 62 is free to move along the axis 41 toward an aligned position with the booster inlet 58. Movement of the second plunger 62 relative to the first plunger 60 provides remote operation of the booster assembly 24,26 (FIG. 1). The remote operation of the booster assemblies 24, 26 allows for the use of a single hydraulic booster assembly 24,26 for actuation of a single brake system by both a front and rear brake positions 12, 14.

Referring to FIG. 1, each booster assembly 24, 26 may be coupled such that actuation of only one of the brake pedals 16, 18 will engage and actuate each brake assembly 11, 13. It is also known that if the booster assemblies 24, 26 are coupled to allow uniform braking between both systems 11, 13 that actuation of one of the rear pedals 20, 22 would have similar results and result in uniform braking of both brake systems 11, 13.

Upon the release of any of the pedals 16, 18, 20,22, the plungers 60,62 and booster piston 46 are returned to a closed position. In the closed position, hydraulic fluid is returned to respective master cylinders 32,34 and reservoir 30. The system is vented to atmosphere by a master cylinder reservoir 36. Although bleed screws 90 are shown in the valve 40, it is known that other configurations are available that would not require bleed screws 90 to be mounted within the booster valve 40.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A hydraulic booster valve assembly comprising;
    a body defining an internal bore, a first inlet and an outlet;
    a booster piston defining a plunger bore and movable within said internal bore to govern fluid flow between said first inlet and outlet;
    first and second plungers disposed within said plunger bore and movable for actuating said booster piston; said second plunger movable independently of said first plunger to actuate said booster piston; and
    a second inlet for communicating fluid pressure to a pressure area between said first and second plungers.

2. The assembly of claim 1, further including a shaft attached to said first plunger and operatively associated with a brake pedal for actuating said first and second plunger.

3. The assembly of claim 1, wherein pressure from said second inlet moves said second plunger relative to said first plunger.

4. The assembly of claim 1, including an annular passage defined between said second plunger and said plunger bore communicating fluid pressure from said second inlet to said pressure area disposed between said first and second plungers.

5. The assembly of claim 1, further including a clip disposed within said bore constraining movement of said first plunger in one axial direction.

6. The assembly of claim 1, wherein said second plunger includes an internal passage cooperating with an inlet port disposed within said booster piston and in fluid communication with said first inlet.

7. The assembly of claim 6, wherein alignment of said internal passage with said inlet port communicates fluid pressure through said second plunger to actuate said booster piston.

8. A hydraulic booster valve assembly comprising:
    a body defining an internal bore, a first inlet and an outlet;
    a booster piston defining a plunger bore and movable within said internal bore to govern fluid flow between said first inlet and outlet; and
    first and second plungers disposed within said plunger bore and movable for actuating said booster piston; said second plunger movable independently of said first plunger to actuate said booster piston; wherein said second plunger includes an internal passage cooperating with an inlet port disposed within said booster piston and in fluid communication with said first inlet, and first and second seals for selectively communicating fluid pressure between said internal passage and said inlet port.

9. A hydraulic booster valve assembly comprising:
    a body defining an internal bore, a first inlet and an outlet;
    a booster piston defining a plunger bore and movable within said internal bore to govern fluid flow between said first inlet and outlet;
    first and second plungers disposed within said plunger bore and movable for actuating said booster piston; said second plunger movable independently of said first plunger to actuate said booster piston; and
    a biasing member biasing said first and second plungers toward a position where said internal passage of said second plunger is not in fluid communication with said inlet port.

10. A bi-directional braking assembly for a vehicle comprising;
    a hydraulic booster assembly for applying fluid pressure to a brake assembly, said hydraulic booster assembly actuated by a forward pedal;
    a master cylinder actuated by a rear pedal to communicate fluid pressure to said hydraulic booster assembly; and
    a hydraulic booster valve disposed within said hydraulic booster assembly to regulate said fluid pressure applied to said brake assembly separately actuatable by one of said forward and rear pedals, said hydraulic booster valve comprising a booster piston for regulating fluid flow between an inlet and an outlet.

11. The assembly of claim 10, wherein said booster piston includes first and second plungers disposed within a plunger bore and movable for actuating said booster piston and said second plunger is movable independently of said first plunger to actuate said booster piston.

12. The assembly of claim 11, further including a shaft attached to said first plunger and operatively associated with a forward pedal for actuating said first and second plunger.

13. The assembly of claim 12, further including a second inlet for fluid pressure communication from said master cylinder, said second inlet communicates fluid pressure to a pressure area between said first and second plungers.

14. The assembly of claim 13 including an annular passage defined between said second plunger and said plunger bore communicating fluid pressure from said second inlet to said pressure area disposed between said first and second plungers.

15. The assembly of claim 11, further including a clip disposed within said bore constraining movement of said first plunger in one axially direction.

16. The assembly of claim 11, wherein said second plunger includes an internal passage cooperating with an inlet port disposed within said booster piston and in fluid communication with said first inlet.

17. The assembly of claim 11, wherein alignment of said internal passage with said inlet port communicates fluid pressure through said second plunger to actuate said booster piston.

18. The assembly of claim 11, wherein said second plunger includes first and second seals for selectively communicating fluid pressure between said internal passage and said inlet port.

19. The assembly of claim 11, further including a biasing member biasing said first and second plungers toward a position where said internal passage of said second plunger is closed to fluid communication with said inlet port.

20. The assembly of claim 10, wherein pressure from said second inlet moves said second plunger relative to said first plunger.

21. A bi-directional braking assembly for a vehicle comprising:

a hydraulic booster assembly for applying fluid pressure to a brake assembly, said hydraulic booster assembly actuated by a forward pedal;

a master cylinder actuated by a rear pedal to communicate fluid pressure to said hydraulic booster assembly;

a hydraulic booster valve disposed within said hydraulic booster assembly to regulate said fluid pressure applied to said brake assembly separately actuatable by one of said forward and rear pedals; and first and second separate circuits, each of said first and second separate circuits including a separate hydraulic booster, master cylinder and forward and rear pedal.

22. The assembly of claim 21, wherein one of said first and second circuits corresponds to a right side, and the other corresponds to a left side such that the vehicle is steered by selective actuation of one of said first and second circuits.

* * * * *